United States Patent

Muratani et al.

[15] 3,676,593

[45] July 11, 1972

[54] DEMODULATION APPARATUS FOR A TIME-DIVISIONAL MULTIPLEX PHASE-SHIFT KEYED SIGNAL OF BURST MODE

[72] Inventors: Takuro Muratani; Akira Ogawa; Kunishi Nosaka, all of Tokyo-to, Japan

[73] Assignee: Kokusai Denshin Denwa Kabushiki Kaisha, Tokyo-to, Japan

[22] Filed: Aug. 12, 1969

[21] Appl. No.: 849,946

[30] Foreign Application Priority Data

Aug. 15, 1968 Japan ....................43/57785

[52] U.S. Cl. ....................178/66 A, 325/320, 178/88 R

[51] Int. Cl. ....................H04l 27/14

[58] Field of Search ....................178/66 R, 67, 70 R, 70 B; 325/13, 30, 320

[56] References Cited

UNITED STATES PATENTS

| | | | |
|---|---|---|---|
| 3,144,608 | 8/1964 | Warring | 325/30 |
| 3,371,279 | 2/1968 | Lender | 325/320 |
| 3,543,162 | 11/1970 | Miller | 325/13 |

*Primary Examiner*—John W. Caldwell
*Assistant Examiner*—Marshall M. Curtis
*Attorney*—Robert E. Burns and Emmanuel J. Lobato

[57] ABSTRACT

A demodulation apparatus for performing coherent detection and code regeneration of a time-divisional multiplex phase-shift keyed signal of burst mode (PSK signal), where the PSK signal and a detected base band signal are respectively applied to a coherent detector and a code regenerator after such signals are delayed by a time necessary to produce a reference-phase carrier wave for the coherent detection and by a time necessary to produce a clock wave for the code regeneration respectively, so that all bits of the PSK signal can be correctly regenerated even if there is no guard time between two successive bursts.

1 Claim, 3 Drawing Figures

DEMODULATION APPARATUS FOR A TIME-DIVISIONAL MULTIPLEX PHASE-SHIFT KEYED SIGNAL OF BURST MODE

This invention relates to demodulation apparatus for performing demodulation, i.e., coherent detection and code regeneration, of a phase-shift keyed signal and more particularly to demodulation apparatus for a time-divisional multiplex phase-shift keyed signal of burst mode.

In a case of demodulation (i.e., coherent detection and code regeneration) of a phase-shift keyed (hereinafter referred as "PSK") signal of burst mode, it is necessary to produce a reference-phase carrier and a clock wave. To attain this object, the following two systems have been adopted in the art. In one conventional system, a synchronous bit is allotted at the start of each burst, so that the reference-phase carrier and the clock wave are produced for each burst by the synchronous bit. In the other prior art system, a plurality of synchronous circuits are provided for respective communicating stations, so that the reference-phase carrier and the clock wave are produced for the respective communicating stations from the synchronous circuits. In the former system, since the synchronous bit is necessary, transmission of messages cannot be performed at the time of the synchronous bit. Therefore, the transmissible quantity of information decreases. On the other hand, in the second system the number of synchronous circuits increases in proportion to an increase of the number of communicating stations, and therefore the control circuit becomes complicated.

An object of this invention is to provide a demodulation apparatus for a time-divisional multiplex PSK signal of burst mode which eliminates the above mentioned defects of conventional systems and which is capable of performing, by simple circuitry, coherent detection of all bits and code regeneration of all bits even if there is no guard time in the PSK signal.

The principle of this invention will be better understood from the following more detailed discussion taken in conjunction with the accompanying drawings, in which the same or equivalent parts are designated by the same reference numerals, characters and symbols, and in which.

The principle of this invention can be summarized as follows. In order to demodulate (i.e., coherent detection and code regeneration) a time-divisional multiplex PSK signal of burst mode which includes signals transmitted from a plurality of communication stations, a plurality of reference carrier regenerators and a plurality of clock regenerators are provided. To perform the coherent detection, (1) the inputs of the reference carrier regenerators are switched in synchronism with signals representative of the start or end of each burst; (2) the outputs of the reference carrier regenerators are switched after a delay time T necessary to provide the reference carrier, as measured from the switching time of said inputs, so that two successive bursts are respectively applied to different reference carrier regenerators; and (3) the PSK signal derived from the input side of the reference carrier regenerators is applied, through a delay means having the delay time T, to a coherent detector. In accordance with the above construction, coherent detection for all bits of the signal of each communicating station can be performed even if there is no guard time between two successive bursts. Then, to perform the code detection, (1) the inputs of the clock regenerators are switched in synchronism with signals representative of the start or end of each burst at the inputs of the clock regenerators; (2) the outputs of the clock regenerators are switched after being delayed by a time $Ta$ necessary to produce the clock signal, as measured, from the switching time of the inputs thereof, so that two successive bursts are respectively applied to different clock regenerators; and (3) the detected output of each burst is applied, through a delay means having the delay time $Ta$, to a code regenerator to which the outputs of the clock regenerators are further applied. In accordance with this construction, code regeneration for all bits of the signal of each communicating station can be performed even if there is no guard time between two successive bursts.

Figure 1:
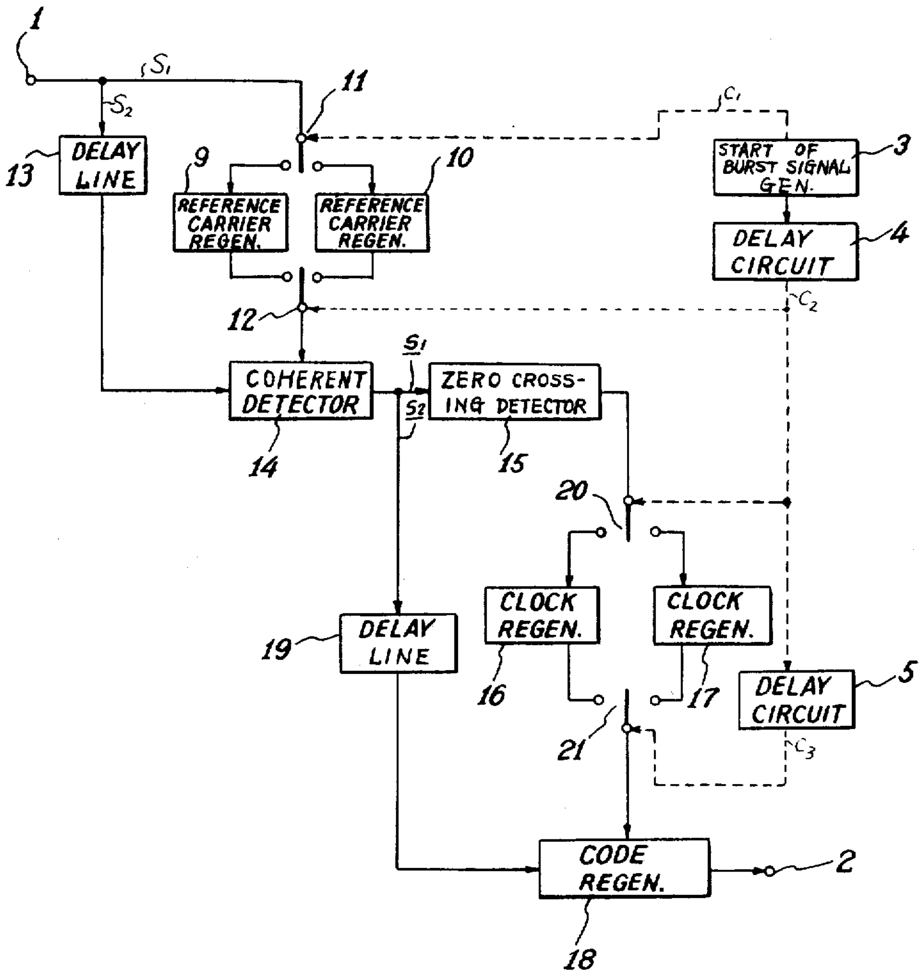
FIG. 1 is a block diagram illustrating an embodiment of this invention.

With reference to FIG. 1, an embodiment of this invention will be described. In this embodiment, a time-divisional PSK signal of burst mode is applied to an input terminal 1 and divided into two signals $S_1$ and $S_2$. One ($S_1$) of the two signals is applied through a switch 11 to either a reference carrier generator 9 or 10. The switch 11 is switched by a start of burst signal generator 3 which generates a first control signal $C_1$ synchronized with the start or end of each burst, so that successive bursts are applied respectively to different ones of the reference carrier regenerators 9 and 10. The outputs of the reference carrier regenerators 9 and 10 are switched by a switch 12 which is controlled by a second control signal $C_2$ delayed by a time T in a delay circuit 4 from the first control signal $C_1$. The delay time T is determined so that each of the reference carrier regenerators 9 and 10 produces a reference-phase carrier wave having a necessary signal-to-noise ratio within the time T starting from the last switching time of the switch 11. On the other hand, the other ($S_2$) of the two signals is applied, through a delay line 13 having the delay time T, to a coherent detector 14 to which the switched output of the switch 12 is further applied. As the result of the above construction, since two inputs of the coherent detector 14 are simultaneously applied to this coherent detector 14 for each burst and the switched output of the switch 12 has a sufficient signal-to-noise ratio, the coherent detection of the PSK signal can be performed from the start of each burst. In this case, since the switch 11 is switched at a time period T in advance of the switching time of the switch 12, the input of the reference carrier regenerator 9 or 10 is cut off during the time T at the end of each burst. However, since the correct phase of the reference-phase carrier wave is held in the reference carrier regenerator 9 or 10, the reference-phase carrier wave having a sufficient signal-to-noise ratio is supplied from the reference carrier regenerator 9 or 10 until the end of each burst.

The detected output of the coherent detector 14 is a base-band signal. This base-hand is divided into two signals $s_1$ and $s_2$. One ($s_1$) of the two signals is applied to a zero-crossing detector 15, in which a timing pulse train for producing a clock wave is detected. The timing pulse train derived from the zero-crossing detector 15 is applied, through a switch 20 switched by the second control signal $C_2$, to either a clock regenerator 16 or 17. The clock regenerator 16 or 17 regenerates a clock wave having a sufficient signal-to-noise ratio by the use of the timing pulse train. The outputs of the clock regenerators 16 and 17 are switched by a switch 21 which is controlled by a third control signal $C_3$ delayed, in a delay circuit 5, by a time $Ta$ measured from the second control signal $C_2$. The delay time $Ta$ is determined so that each of the clock regenerators 16 and 17 produces the clock wave having a necessary signal-to-noise ratio within the time $Ta$ starting from the last switching time of the switch 20. On the other hand, the other ($s_2$) of the two signals is applied, through a delay line 19 having a delay time Ta (nearly equal to T), to a code regenerator 18 to which the switched output of the switch 21 is further applied. The code regenerator 18 is, by way of example, a sampler, and as the result of the above operation, since two inputs of the code regenerator 18 are simultaneously applied to this code regenerator 18 for each burst, the code regeneration of each burst can be performed from the start of each burst by the use of the clock wave having a sufficient signal-to-noise ratio.

In the above mentioned embodiment, each of the reference carrier regenerators 9 and 10 is formed by the use of a voltage-controlled oscillator controlled by a phase-locked loop.

In a first example of the reference carrier regenerator, (1) the modulating signal (a base band signal) of the PSK signal is detected at a first phase detector by the use of the output of the voltagencontrolled oscillator; (2) the amplitude of the detected output of the first phase detector is limited at an amplitude limiter; (3) a continuous wave accompanied by noise in the transmission medium of the PSK signal is obtained from a phase modulator in which the PSK signal is inversely phase-modulated by the output of the limiter; (4) the noise in the continuous wave is detected at a second phase detector by the use of the output of the voltage-controlled oscillator; and (5) the noise detected is applied to the voltage-controlled oscillator to control the frequency thereof so that the phase locked loop comprises the second phase detector and the voltage-controlled oscillator. Consequently, the reference-phase carrier wave is obtained from the voltage-controlled oscillator.

In a second example of the reference carrier regenerator, (1) a PSK signal without noise is regenerated at a PSK signal direct-regenerator by the use of the output of the voltage controlled oscillator; (2) the PSK signal without noise is applied to a phase detector together with the input PSK signal with noise to detect noise; and (3) the detected noise is applied to the voltage-controlled oscillator as the control signal therefor, so that the phase-locked loop comprises the PSK signal direct-regenerator, the phase detector and the voltage-controlled oscillator. Similarly, the reference-phase carrier wave is obtained from the voltage-controlled oscillator.

In a third example of the reference carrier regenerator, (1) the PSK signal direct-regenerator of the second example is replaced by a cascade connection of a second phase detector, an amplitude limiter and a phase modulator; (2) the second phase detector produces a base band signal from the PSK signal by the use of the output of the voltage-controlled oscillator; (3) the amplitude of the detected base band signal is limited by the amplitude limiter; and (4) the PSK signal without noise is produced from the phase modulator by phase-modulating the output of the voltage-controlled oscillator by the limited base band signal. The reference-phase carrier wave is obtained from the voltage-controlled oscillator.

The clock regenerator 16 or 17 can be also formed into similar circuitry as the above mentioned reference carrier regenerator.

The regenerated code is obtained at an output terminal 2. The start of burst signal generator is usually controlled by the regenerated code, but may be controlled by another regenerated code obtained by another regeneration system (not shown).

Figure 2:
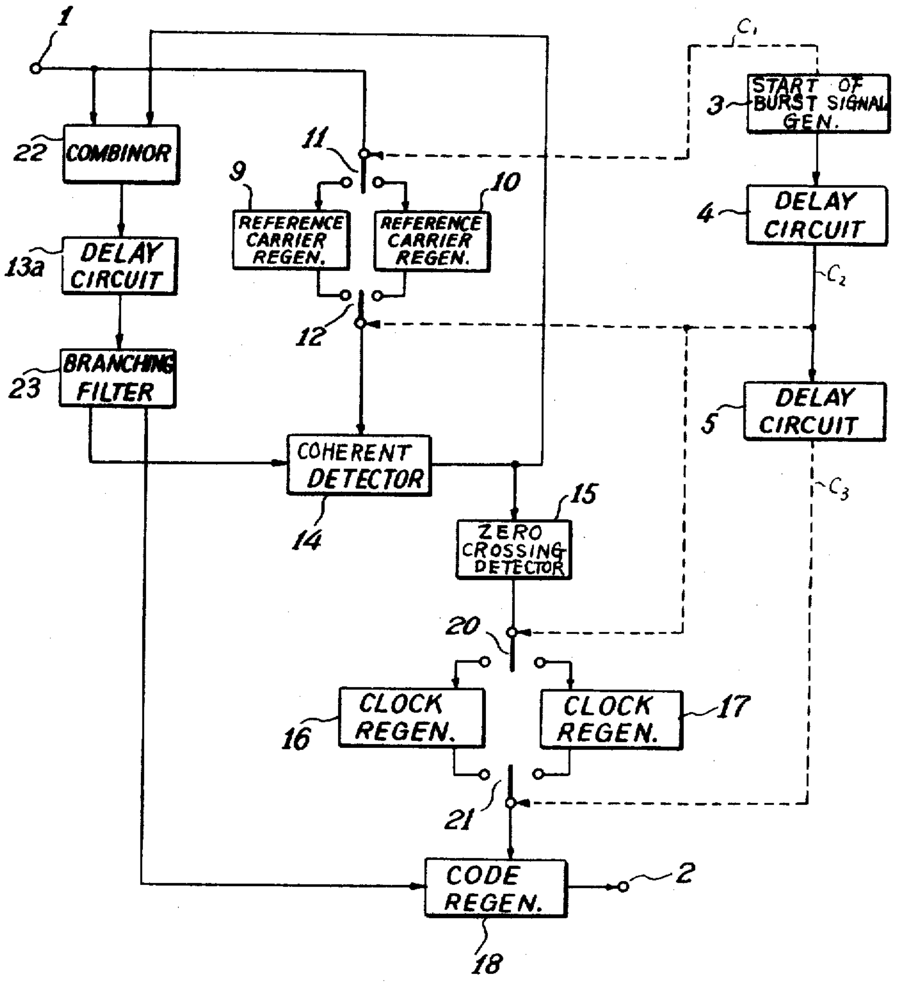
FIG. 2 is a block diagram illustrating another embodiment of this invention.

With reference to FIG. 2, another embodiment of this invention will be described. To simplify the description, only different parts from the embodiment shown in FIG. 1 will be described. In this embodiment, the delay lines 13 and 19 are replaced by a wide band delay circuit 13a having the delay time T. Therefore, the input PSK signal is applied, through a combiner 22, the delay circuit **13*a* and a branching filter 23, to the coherent detector 14. Moreover, the detected output of the coherent detector 14 is applied to both the zero-crossing detector 15 and the combiner 22. This detected output passes through the combiner 22, the delay circuit 13*a* and the branching filter 23 and is applied to the code regenerator 18. Since the output of the coherent detector 14 passes through the same delay circuit 13a** as the PSK signal, the delay time T*a* of the delay circuit 5 is determined so as to be substantially equal to the delay time T of the delay circuit 4.

Figure 3:
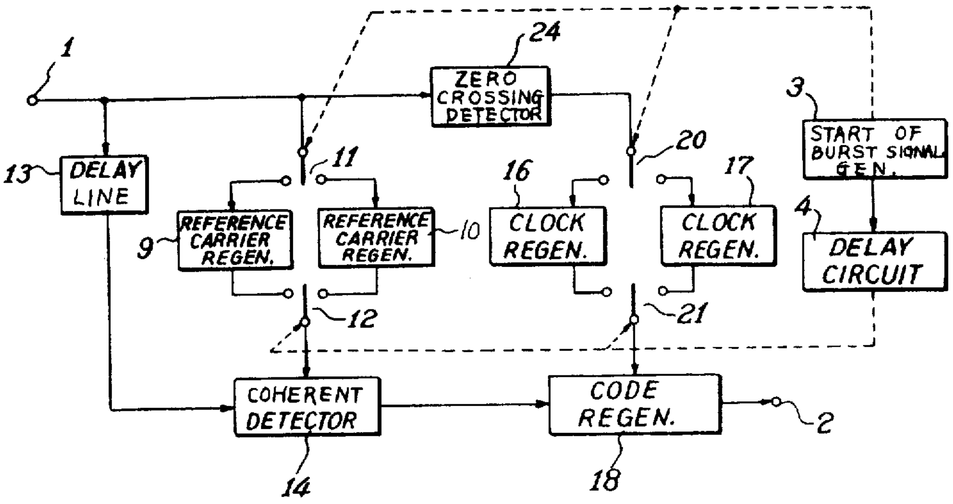
FIG. 3 is a block diagram illustrating a further embodiment of this invention.

With reference to FIG. 3, another embodiment of this invention will be described. In this embodiment, a zero crossing detector 24 produces directly, from the PSK signal, a timing pulse train for producing a clock wave, and regenerations of the reference phase carrier wave and of the clock wave are performed in a parallel arrangement as shown. To attain this object, the zero crossing detector 24 comprises a combination of a delay detector and a full-wave rectifier or a combination circuit, in which the PSK signal is divided into two signals, one of which is delayed by half the bit space thereof, and phase-detection between the other of the two signals and the delayed signal is performed. As the result of this construction, it is not necessary to delay the base band signal obtained at the output of the coherent detector 14, and the delay line 13 serves to delay only the PSK signal. The output of the coherent detector 14 is directly applied to the code regenerator 18. The switches 11 and 20 are controlled by the first control signal $C_1$, and the switches 12 and 21 are controlled by the second control signal $C_2$ delayed by the time T from the first control signal $C_1$.

In all of the embodiments, the zero crossing detector 15 or 24 may be provided for each of the clock regenerators 16 and 17. Moreover, the number of the reference carrier regenerators 9 and 10 and the number of the clock regenerator 16 and 17 may be increased in excess of two mentioned above.

What we claim is:

1. A demodulation apparatus for performing coherent detection and code regeneration of a time divisional multiplex phase-shift keyed (PSK) signal of burst mode including signals transmitted from a plurality of communicating stations, comprising:

input terminal means for receiving said PSK signal, a plurality of reference carrier regenerators each for regenerating a reference-phase carrier wave for said coherent detection, means for generating a first control pulse at the start or end of each burst, a first switching means connected to said first control pulse means for actuation by said first control pulses, said first switching means having contacts coupled to said input means and inputs of said reference carrier regenerators for successively distributing the PSK signal to the reference carrier regenerators in response to said first control pulses generated in synchronism with the start or end of each burst, means for generating a second control pulse after a first delay time, as measured from each first control pulse, wherein said first delay time is equal to the time necessary to produce the reference-phase carrier wave of a desired signal-to-noise ratio in each of the reference carrier regenerators, a second switching means connected to said second control pulse means for actuation by said second control pulses, said second switching means having an output contact which is successively coupled to outputs of said reference carrier regenerators for successively switching the outputs of the reference carrier regenerators in response to the second control pulses, a delay means coupled to said input terminal means for delaying the PSK signal for a time equal to said first delay time, a coherent detector having a first input coupled to an output of the delay means and a second input coupled to said output contact of the second switching means for performing said coherent detection of the PSK signal passed through the delay means by the use of the output of the second switching means, a plurality of clock regenerators each for regenerating a clock wave for said code regeneration, a third switching means connected to said second control pulse means for actuation by said second control pulses, said third switching means having contacts coupled to said input terminal means and to the inputs of said clock regenerators for successively distributing the PSK signal to the clock regenerators in synchronism with the first control pulses a fourth switching means connected to said third control pulse means for actuation by said third control pulses, said fourth switching means having contacts coupled to the output of said clock regenerators for successively switching the outputs of the clock regenerators in synchronism with the second control pulses, and a code regenerator coupled to outputs of said coherent detector and said fourth switching means for receiving the output of the coherent detector and for performing said code regeneration by the use of the output of the fourth switching means.

* * * * *